United States Patent Office 3,486,850
Patented Dec. 30, 1969

3,486,850
FLASH COOLING OF LIQUOR DURING THE CONTINUOUS PRECIPITATION OF ALUMINA HYDRATE FROM BAYER PROCESS LIQUOR
Jeptha V. Day, Baton Rouge, La., assignor to Kaiser Aluminum & Chemical Corporation, Oakland, Calif., a corporation
Filed Feb. 16, 1967, Ser. No. 616,607
Int. Cl. C01f 7/34
U.S. Cl. 23—143                              4 Claims

ABSTRACT OF THE DISCLOSURE

A continuous process for increasing the yield and particle size of alumina hydrate precipitated from supersaturated caustic aluminate liquor wherein the liquor is seeded with alumina hydrate and successively and continuously flows through a plurality of precipitation stages under a controlled relationship between temperature and alumina to caustic ratio. The liquor is subjected to an interstage flash cooling step when a critical value of alumina to caustic ratio is reached.

BACKGROUND OF THE INVENTION

The present invention relates to the production of alumina from aluminous ores according to the well-known Bayer process. More particularly, the invention is directed to an improved process of precipitating and separating alumina hydrate particles from aqueous solutions of alkali metal aluminate.

The wet alkali aluminate method for production of alumina from aluminous ores, more commonly referred to as the Bayer Process, involves subjecting a slurry of raw aluminous ore, e.g. bauxite, in recycled spent caustic aluminate liquor of a predetermined caustic soda concentration through a digestion treatment, usually under heat and pressure, to extract the caustic soluble or available alumina in the ore and to produce an alumina or sodium aluminate enriched caustic soda liquor in which is suspended the ore residue consisting essentially of hydrated ferric oxide, desilication products in the form of complex sodium aluminum silicates together with small amounts of other insoluble components of the ore, such as titanium dioxide. Following digestion, the green liquor containing the insoluble residues is cooled and then subjected to clarification wherein the insoluble residues are removed by settling and/or filtration. The filtered product or filtrate is hot green liquor and substantially free of the red mud residue. The green liquor is then subjected to a flash cooling to increase the degree of supersaturation after which it is processed for the recovery of dissolved alumina by the introduction of fine, previously precipitated alumina hydrate as seed.

The resultant precipitation of the alumina hydrate from the pregnant liquor is usually allowed to proceed under controlled conditions for a selected period of time to obtain a predetermined yield of alumina hydrate and an alumina-to-caustic soda ($A/C$) ratio in the spent liquor (the so-called finishing ratio) of a predetermined value. Generally, the precipitation in a given cycle proceeds to a point where fifty percent or less of the dissolved alumina in sodium aluminate form has been precipitated as alumina hydrate. The precipitate is then classified into coarse and fine fractions. The fine fraction is generally recycled to the precipitation phase as seed hydrate. The coarse fraction is washed to remove accompanying spent liquor, filtered and calcined for removal of both free water and water of crystallization to form product alumina. The spent liquor from the precipitators is recycled to the digestion phase of the process, after adjustment to the required caustic soda concentration, depending upon digestion conditions, by evaporation and/or the addition of make-up caustic soda.

Because of the complex mechanisms involved in alumina precipitation, the reaction conditions under which the precipitation process is carried out have been determined principally by empirical observations. Hydrate particle size distribution is important since a certain size range is wanted in the product and another in the seed. Therefore, temperature, seed charges and concentrations are adjusted to give an economic balance between the weight of product and the weight of seed produced during the precipitation period. The more alumina precipitated, the less the amount of alumina and caustic that must be continuously recycled to digestion and the lower the process heat and handling cost per ton of product. But on the other hand, the lower the alumina to caustic (finishing) ratio, the finer the particles produced. Consequently, for satisfactory results, the precipitation process must be delicately balanced to operate at the lowest finishing ratio consistent with the desired particle size distribution.

In the precipitation phase of the Bayer Process, it has been customary to employ a batch operation which, in a commercial Bayer operation, involves many large agitator tanks to accommodate the volume of pregnant green liquor from the previous step in the process, namely clarification. An example of a typical precipitation tank is one 24 feet in diameter and 60 feet high, with an open top and a 90-degree cone bottom. A typical precipitator charge to such a tank would be 180,000 gallons of liquor and 75,000 pounds of fine seed. A suitable agitating device, such as an air lift mounted along the precipitator center line holds the seed in suspension. During the precipitation cycle, which may vary from about 24 to 48 hours, half of the dissolved alumina is precipitated onto the seed. The conditions under which the precipitation process has been carried out have been largely determined by empirical observations. The liquor in the precipitation tank cools under ambient conditions. This limited cooling of the liquor makes for difficulty in obtaining a satisfactory balance between yield and particle size. A coarse product may be produced in the first part of the cycle from a warmer liquor but the limited cooling inhibits the precipitation at the end to give a low yield. If the precipitation tank is charged with a cooler liquor, the yield will be greater but the alumina precipitated at the first part of the cycle is finer as well as the product produced at the end.

The problems faced in precipitation of alumina are dilemmas between hot liquor and high finishing ($A/C$) ratio for coarseness, or cold liquor and low finishing ratio for fineness, and between a large seed charge for a good yield of fines or a small charge for a lesser yield of coarse product.

While most of the prior art precipitation systems operate on the batch principle, whereby liquor is introduced into a tank and precipitation allowed to proceed therein, some attempts at continuous precipitation, wherein the pregnant liquor is passed through a series of tanks, are described in the art. These prior art attempts at improvement of the precipitation process, however, are subject to the same problems of obtaining proper controlled cooling of the pregnant liquor and a satisfactory balance between yield and particle size.

SUMMARY OF THE INVENTION

The present invention is directed to an advantageous solution to the problems inherent in alumina precipitation. Furthermore, the present invention presents a continuous precipitation procedure wherein there is an efficacious control for maintaining the proper relationship between the temperature of the pregnant liquor and the concentration of sodium aluminate or $A/C$ ratios to give a high yield of a coarse, sandy product alumina suitable for use in the electrolytic cells for producing aluminum. Additionally, the instant process results in a savings in labor and capital costs.

These and other advantages of the proposed precipitation procedure of the invention will become apparent from the following description thereof. The present precipitation process is a concurrent continuous process designed to produce a coarse, sandy product alumina. The invention is predicated upon the discovery of the proper process conditions for a maximum particle size growth. The process provides an interstage cooling of the liquor which gives added flexibility and temperature control of the liquor for maximum yield.

The process generally comprises feeding pregnant liquor (which is supersaturated with alumina and which is obtained from the digestion step of the Bayer Process wherein bauxite is reacted with caustic) to the first stage of a series of precipitation stages, the liquor being at a temperature in the range of about 150° to 170° F. and having an alumina to caustic ratio $(A/C)$ of greater than 0.500. The expression alumina to caustic ratio, refers to the ratio of the weight of alumina ($Al_2O_3$) to the weight of caustic in a given volume of liquor, where the caustic is defined as the sum of the free sodium hydroxide and that combined with the alumina and is expressed as the weight of sodium carbonate. The first stage is seeded with previously precipitated alumina hydrate of a predetermined seed surface area, and the liquor and seed is passed through successive stages until the alumina to caustic $(A/C)$ ratio of the liquor is between about 0.400 to 0.500, preferably 0.450. The liquor is then flash cooled to a temperature at which the driving force of the precipitation reaction will be increased. In general, the liquor is flash cooled at least 10° F., and preferably it is cooled to about 140° F. After flash cooling, the liquor and seed is passed through further successive precipitation stages until a finishing ratio of alumina to caustic of about 0.350 is attained. The depleted or spent liquor and the precipitated alumina hydrate from the last of the stages is withdrawn; and the alumina hydrate is classified into coarse and fine particles as it is separated from the spent liquor.

BRIEF DESCRIPTION OF DRAWINGS

The invention is described with respect to FIGURE 1 which is a schematic flow diagram showing the continuous precipitation process of the invention and including the classification and washing system for processing the precipitated alumina hydrate and FIGURE 2 which is a cooling curve showing the relationship between $A/C$ ratio and temperature during progress of the continuous precipitation of the invention. The figures are included for illustrating the instant invention and are not to be construed as limiting the scope thereof.

DETAILED DESCRIPTION

Figure 1:
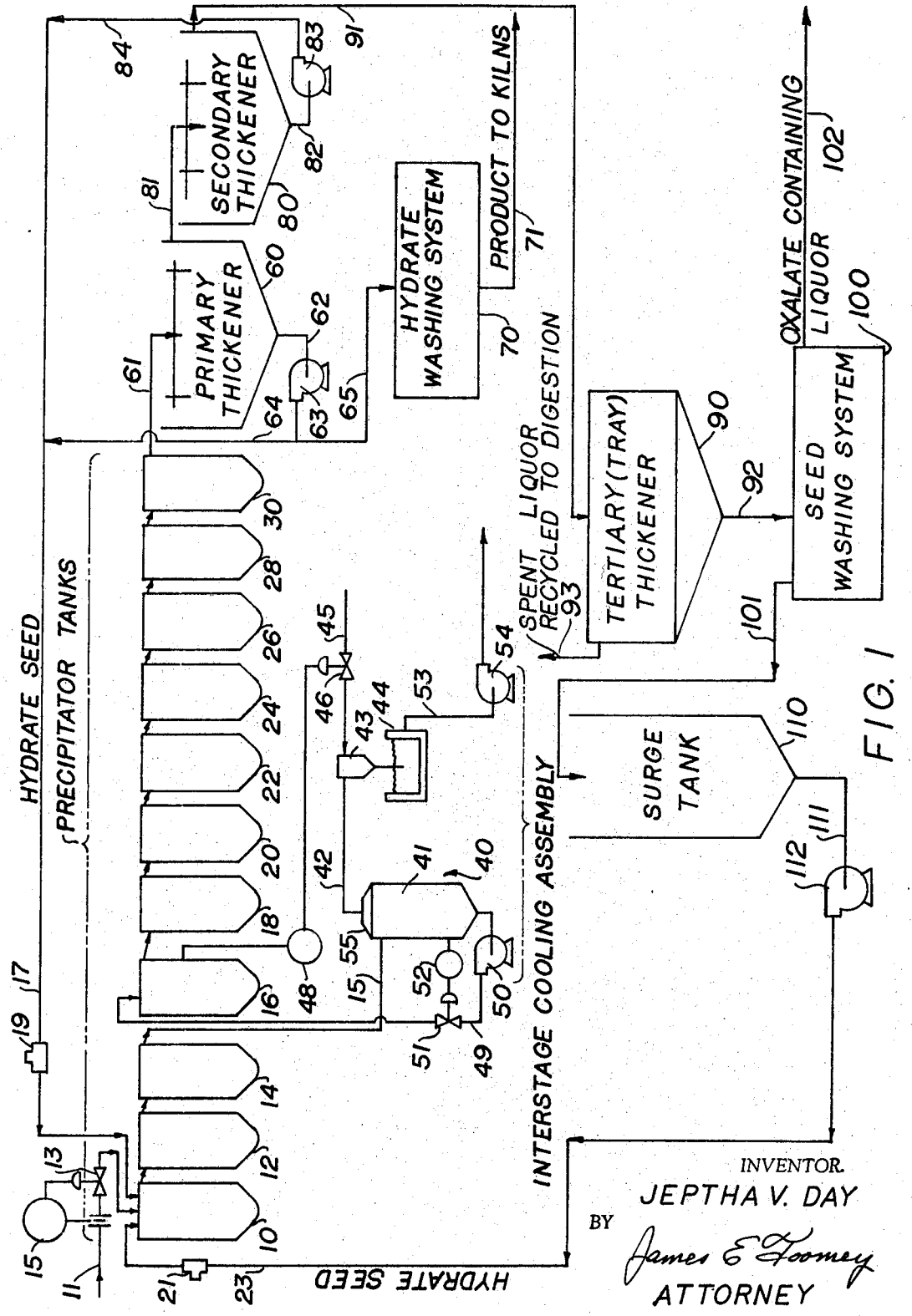

Referring now to FIGURE 1 which is a flow diagram schematically illustrating the process of the invention, there is shown a plurality of precipitator tanks connected in series as well as classification and washing equipment for processing the alumina from the precipitator tanks into product alumina and seed which is recycled to the precipitators. In FIGURE 1 there is shown eleven precipitator tanks, 10, 12, 14, 16, 18, 20, 22, 24, 26, 28 and 30, connected in series; however, various numbers of tanks may be used without departing from the scope of the invention. In a commercial operation, one or more spare tanks would be provided. Also, provisions would be included in the system for by-passing each tank in the series without interrupting plant flow. This would permit individual precipitators to be removed from service from time to time for maintenance or cleaning without interruption of the plant flow or reduction in plant capacity.

As illustrated in FIGURE 1, pregnant sodium aluminate solution or liquor which is supplied to the first precipitator tank 10 via conduit 11. Valve 13 and flow controller 15 in conduit 11 are provided for controlling the amount and flow rate of pregnant liquor fed to precipitator tank 10. Controlled amounts of alumina seed slurry are fed to precipitator tank 10 via conduits 17 and 23. Mass flow meters 19 and 21 are provided in conduits 17 and 23, respectively, to control the amount of seed fed to tank 10. The pregnant liquor and seed are agitated or mixed in tank 10 by any suitable means (not shown) such as mechanical agitators or air lifts. The pregnant liquor is preferably agitated by circulating through a central draft tube (not shown) located within the tank 10. The other tanks in the series, namely tanks 12, 14, 16, 18, 20, 22, 24, 26, 28 and 30, are likewise equipped with agitators and central draft tubes. Effluent from tank 10 continuously overflows to the second tank in the series, precipitator tank 12, and from tank 12 to precipitator tank 14, etc.; thus, the pregnant liquor flows successively through each of the eleven tanks shown in FIGURE 1, except for an interstage cooling step described hereinbelow.

The transfer of liquor and seed from one precipitating tank to the next successive tank in the series can be either by gravity flow or by mechanical transfer, such as by pumps. In most instances, the former, that is, gravity flow, is preferred and in the usual case 3 to 6% slope or elevation change is allowed between each successive precipitation stage or tank.

The precipitator tanks are not insulated and the pregnant liquor and seed suspension is cooled under ambient conditions during its flow through the tanks. An interstage cooling step is provided to flash cool the liquor after the pregnant liquor has reached a particular $A/C$ ratio. In FIGURE 1 an interstage cooling assembly 40 is shown between the third and fourth precipitation stages, namely between tanks 14 and 16. The interstage cooling may occur between other stages of precipitation, the schematic diagram of FIGURE 1 showing only an embodiment of the invention.

The interstage cooling assembly 40 is comprised in general of a flash tank 41 having a cover 55 mounted thereon and a barometric condenser 43. The pregnant liquor is withdrawn from the overflow of tank 14 and fed to flash tank 41 via conduit 15. As the pressure in flash tank 41 is less than the vapor pressure of the pregnant liquor, a portion of the liquor is vaporized and leaves tank 41 and enters the barometric condenser 43 via conduit 42. The vapor in the barometric condenser is condensed to liquid by cooling water supplied via conduit 45. The condensed vapor and cooling water descends through the tailpipe of the barometric condenser 43 into hot well 44 by gravity and is removed by means of a pump 54 from the hot well 44 to waste via a conduit 53. The cooled liquor in tank 41 is discharged by means of pump 50 through conduit 49 into precipitator tank 16. A valve 51 in conduit 49 and a level controller 52 which senses the level in flash tank 41 controls the flow of cooled liquor to precipitator tank 16.

The desired temperature of the liquor in precipitator tank 16 is controlled by temperature controller 48 which senses the temperature of the liquor in tank 16 and valve 46 which controls the amount of cooling water flowing to barometric condenser 43 via conduit 45.

The pregnant liquor then flows from tank 16 to tank 18 and from tank 18 to tank 20, etc. to the last tank 30. From tank 30 the pregnant liquor is processed in primary thickener 60, secondary thickener 80 and tertiary (tray) thickener 90 to obtain product alumina and seed that is referred to as primary, secondary and tertiary thickener hydrates, respectively, which are merely separated hydrate fractions of successively smaller size. Thus, the hydrate obtained from primary thickener 60 is product of relatively larger particle size which is not usually used as seed while the hydrate from the secondary thickener 70 is of smaller average particle size and that obtained from the tertiary or tray thickener 90 is the hydrate of smallest average size. Typical size differences among the primary, secondary and tertiary hydrates are shown as follows:

|  | +100 Mesh Percent [1] | +200 Mesh Percent [1] | +325 Mesh Percent [1] | −325 Mesh Percent [1] |
|---|---|---|---|---|
| Primary hydrate | 1 | 55 | 94 | 6 |
| Secondary hydrate | 0.6 | 45 | 87 | 13 |
| Tertiary hydrate | 0 | 6 | 41 | 59 |

[1] Tyler screen scale.

The effluent from the last precipitator tank 30 flows through a conduit 61 into primary thickener 60. In the primary or coarse particle thickener 60, the fine particles of alumina hydrate are separated from the coarse hydrate particles by elutriation, and the major portion of the spent liquor along with the fine particles are fed to the secondary thickener via conduit 81. The relatively high-solids, coarse-hydrate slurry is fed via lines 62 and 65 by means of pump 63 through a hydrate washing system 70 which is generally comprised of a plurality of hydrate wash tanks and a filter (not shown). After hydrate washing the alumina hydrate is transferred to kilns, as shown by line 71, wherein it is subjected to calcination to form product alumina, the reaction being:

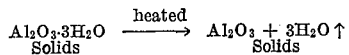
$$Al_2O_3 \cdot 3H_2O \text{ (Solids)} \xrightarrow{\text{heated}} Al_2O_3 \text{ (Solids)} + 3H_2O \uparrow$$

If desired, the coarse hydrate from primary thickener 60 can be utilized as seed as shown by conduit 64 and 17 transporting seed to the first precipitator tank 10.

The secondary thickener 80 receives the spent liquor and fine particles from the primary thickener 60 via conduit 81 and separates the larger particles from the spent liquor and the finer particles by elutriation as in the case of the operation of primary thickener 60. The larger size particles are removed from the thickener 80 via conduits 82 and 84 by means of pump 83 to conduit 17 whereby the alumina hydrate particles are returned to precipitator tank 10 as seed. The overflow from secondary thickener is fed to a tertiary (tray) thickener 90 via conduit 91. In tertiary thickener 90 the fine particles of alumina hydrate are separated from the spent liquor. The overflow spent liquor is recycled to the digestion phase of the Bayer Process via line 93 while the underflow is fed to a seed washing system 100 wherein the fine alumina hydrate particles are subjected to filtering and washing to remove oxalate. The seed washing procedure is disclosed and claimed in U.S. Patent 3,372,985, filed June 5. 1967. In seed washing system 100 the spent liquor is removed from the fine particles of alumina hydrate by suitable filtration means, such as a rotary belt filter (not shown). A water spray washes the filter cake with an amount of water, preferably cold water, sufficient to remove substantially all of the spent caustic liquor, the primary filtrate which can be recycled in the process. The cold water washed alumina hydrate is then subjected to a washing with hot water to dissolve substantially all of the oxalate contaminate, and the alumina hydrate particles are then separated from the sodium oxalate containing wash water. The washed alumina hydrate particles are then mixed with caustic liquor to form a slurry and fed to surge tank 110 via conduit 101. The oxalate containing liquor may be discarded via line 102 or it may be treated in a suitable oxalate precipitation system as described and claimed in the aforementioned U.S. Patent 3,372,985. The tertiary seed in surge tank 110 is fed to the precipitator tank 10 via conduits 111 and 23 by means of pump 112.

Figure 2:
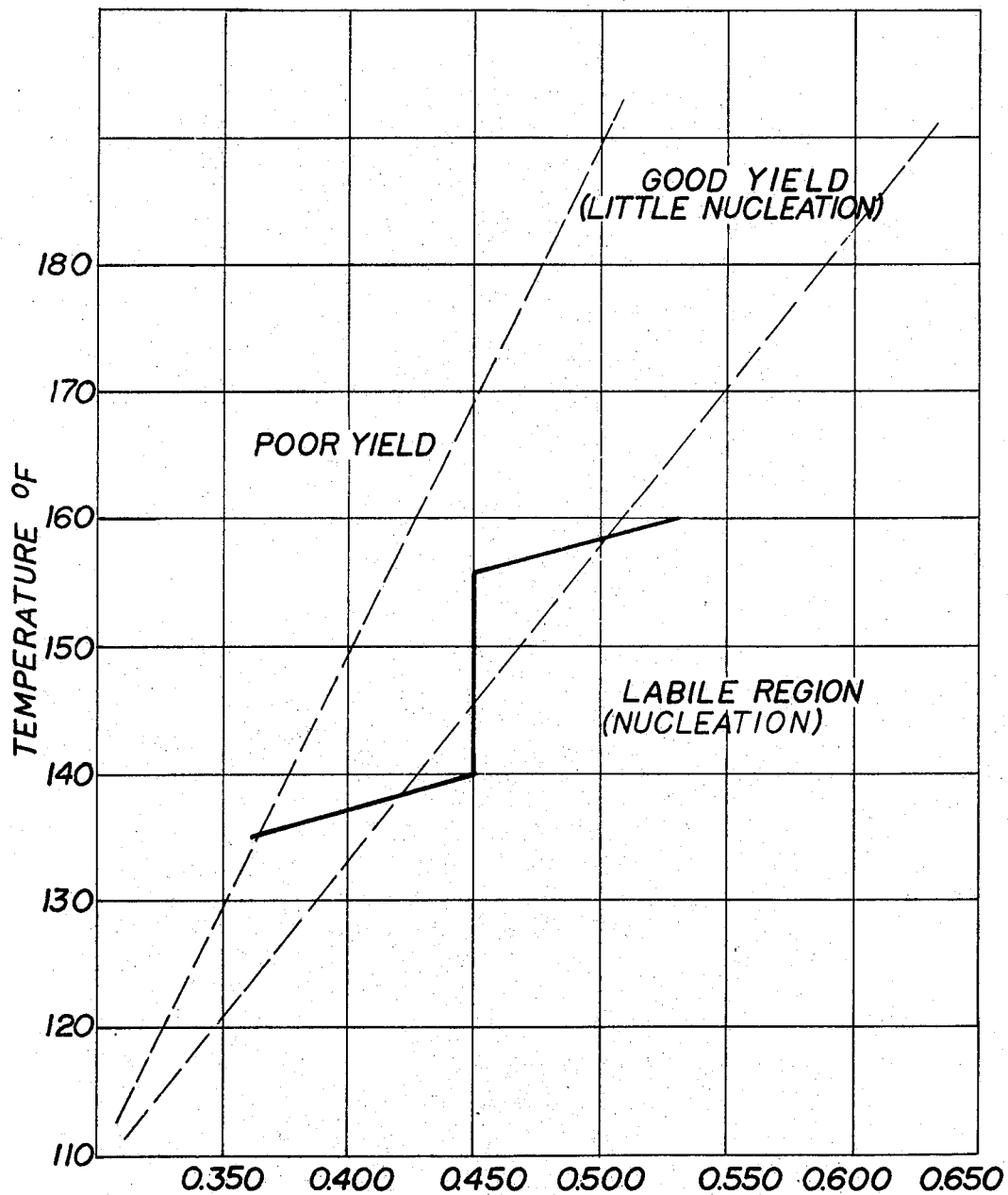

FIGURE 2 depicts a typical cooling curve for pregnant liquor processed according to a precipitation system shown in FIGURE 1. The $A/C$ ratio is plotted on the abscissa and temperature on the ordinate. The curve shows the cooling of the pregnant liquor from the starting $A/C$ ratio of about 0.530 and a temperature of 160° F. through the precipitation stages until an $A/C$ ratio of the liquor of .450 is reached. The liquor is then flash cooled to 140° F. after which it is returned to the subsequent precipitating tanks and circulated through successive precipitating tanks in the series until a finishing ratio of 0.356 and a temperature of 135° F. is reached.

Also in FIGURE 2, delineated by dotted lines, are shown regions of poor yields, good yield and the labile region. In the cooling curve of the illustration it is to be noted that the precipitation starts in the labile region wherein nucleation is promoted; however, as shown by the curve, the pregnant liquor is subjected for the major portion of its cycle to conditions which promote a good yield with little nucleation.

As an illustration of the invention, with reference to FIGURES 1 and 2, a pregnant liquor containing 180 grams per liter of caustic soda (calculated as $Na_2CO_3$) and having an $A/C$ ratio of 0.645 and at a temperature of 165° F. is introduced into the first precipitator tank at a rate of 2,419 gallons per minute. Seed slurry comprised of seed and spent caustic liquor is introduced into the first precipitator tank at a rate of 380 gallons per minute. The seed is of the following particle size:

Percent retained on 200 mesh [1] _____ 40–60
Percent retained on 325 mesh [1] _____ 75–90

[1] Tyler Screen Scale.

In weight of hydrate ($Al_2O_3 \cdot 3H_2O$) this amounts to 2,220 lbs. per minute. The specific surface area of the seed is 800 cm.²/g. The pregnant liquor and seed is agitated in the first precipitator tank and the effluent from this tank flows to the second precipitator tank, etc., as is described above for FIGURE 1. Between the third and fourth precipitator tanks, the pregnant liquor is flash cooled to 140° F., the interstage cooling procedure as shown in FIGURE 1. The total time for the pregnant liquor to flow through the eleven precipitator tanks, including the interstage cooling, is about 40 hours. The $A/C$ ratio of the liquor leaving the last precipitator tank and entering the classifiers is 0.350 and the temperature is 135° F. The product yield is about 51 g./l. $Al_2O_3$ which indicates that about 44% of the dissolved alumina of the entering pregnant liquor is precipitated as alumina hydrate.

The alumina hydrate from the primary thickener, after hydrate washing and calcination, is a coarse, sandy product meeting the following particle size specifications:

Product retained: [1]                        Weight percent
   325 mesh (44 microns) _____minimum__ 90
   100 mesh (149 microns) _____maximum__ 7

[1] Tyler Standard Screen Scale.

Having now described the invention, what is claimed is:

1. In a continuous process for precipitating alumina hydrate from a supersaturated caustic aluminate liquor wherein said liquor, having an $A/C$ ratio of greater than 0.500 is continuously fed to the first stage of a series of precipitation stages, alumina hydrate seed is added to said liquor in the first stage, the liquor and seed is passed through a series of successive precipitation stages with ambient cooling until the $A/C$ ratio is about 0.350, depleted liquor and precipitated alumina hydrate are withdrawn from the last stages and said alumina hydrate is classified into coarse and fine particle size fractions while said hydrate is separated from the depleted liquors, the improvement comprising, passing the liquor and seed through precipitation stages until an $A/C$ ratio between 0.400 and 0.500 is reached and then flash cooling said liquor to increase the driving force of the precipitation reaction and thereby controlling the alumina hydrate yield and particle size.

2. The process of claim 1 wherein the liquor is flash cooled at least 10° F.

3. A continuous process for maximizing the yield while increasing the particle size of alumina hydrate precipitated from a supersaturated caustic aluminate liquor which comprises:
  (a) continuously feeding said liquor to the first stage of a series of precipitation stages, said liquor being at a temperature in the range of about 150°–170° F. and having an $A/C$ ratio of greater than 0.500;
  (b) seeding said liquor in said first stage with alumina hydrate of a predetermined seed surface area;
  (c) passing said liquor and seed through successive precipitating stages with ambient cooling until the $A/C$ ratio becomes 0.450;
  (d) flash cooling said liquor to a temperature of about 140° F.;
  (e) passing the cooled liquor and seed through further successive stages of the precipitation stages with ambient cooling until the $A/C$ ratio is about 0.350;
  (f) withdrawing depleted liquor and precipitated alumina hydrate from the last of said stages;
  (g) classifying said alumina hydrate into coarse and fine particle size fractions while it is separated from the depleted liquor.

4. A continuous process for increasing the yield and particle size of alumina hydrate precipitated from a supersaturated caustic aluminate liquor which comprises:
  (a) feeding said liquor to the first stage of a series of precipitation stages, said liquor being at a temperature of about 160° F., and having an $A/C$ ratio of greater than 0.500;
  (b) seeding said liquor in said first stage with alumina hydrate of a predetermined seed surface area;
  (c) passing said liquor and seed through successive stages until the $A/C$ ratio of said liquor is about .450;
  (d) flash cooling said liquor to a temperature of about 140° F.;
  (e) passing said flash cooled liquor and seed through further successive precipitation stages until an $A/C$ ratio of about 0.350 is reached;
  (f) withdrawing depleted liquor and precipitated alumina hydrate from the last of said stages;
  (g) classifying said alumina hydrate into coarse and fine particle size fractions while it is separated from the depleted liquor.

References Cited

UNITED STATES PATENTS

| | | | |
|---|---|---|---|
| 1,314,710 | 9/1919 | Sherwin | 23—143 |
| 1,315,045 | 9/1919 | Sherwin | 23—143 |
| 1,943,786 | 1/1934 | Cowles | 23—143 |
| 2,380,804 | 7/1945 | Tiedemann | 23—143 |
| 2,606,820 | 8/1952 | Harms | 23—143 X |
| 2,664,349 | 12/1953 | Sable | 23—143 |
| 2,701,752 | 2/1955 | Porter | 23—143 |
| 2,707,669 | 5/1955 | Houston et al. | 23—143 |
| 2,946,658 | 7/1960 | Donaldson | 23—143 |
| 3,201,199 | 8/1965 | Lindsay et al. | 23—143 |
| 3,372,985 | 3/1968 | Roberts et al. | 23—143 |

FOREIGN PATENTS

| | | |
|---|---|---|
| 605,650 | 9/1960 | Canada. |
| 1,045,216 | 10/1966 | Canada. |

OSCAR R. VERTIZ, Primary Examiner

G. T. OZAKI, Assistant Examiner

U.S. Cl. X.R.

23—143